Oct. 12, 1948.     J. G. VINCENT     2,451,132
INTERNAL-COMBUSTION ENGINE
Filed Oct. 22, 1943     4 Sheets-Sheet 1
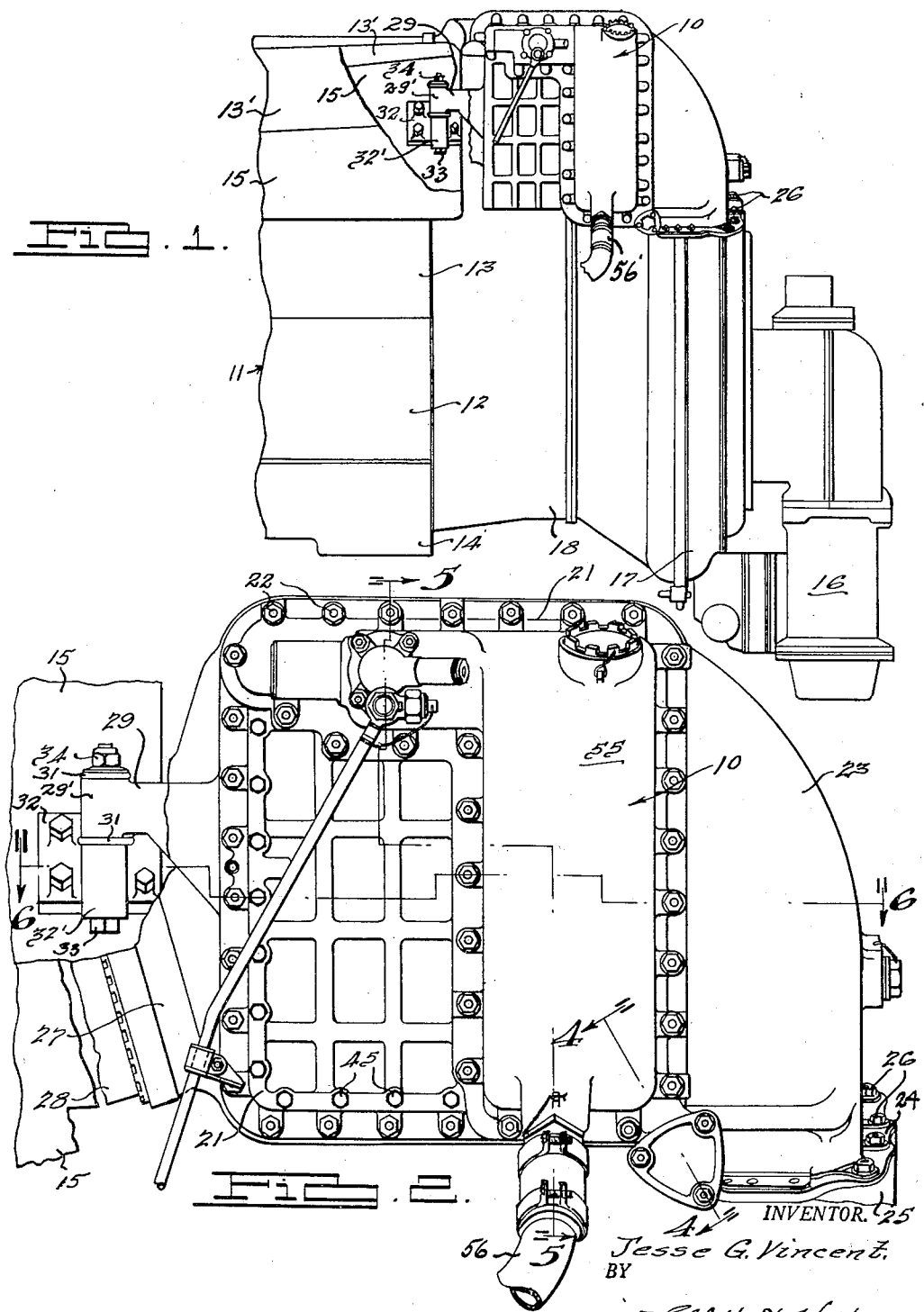
INVENTOR.
Jesse G. Vincent
BY
Sibbetts & Hart
ATTORNEYS.

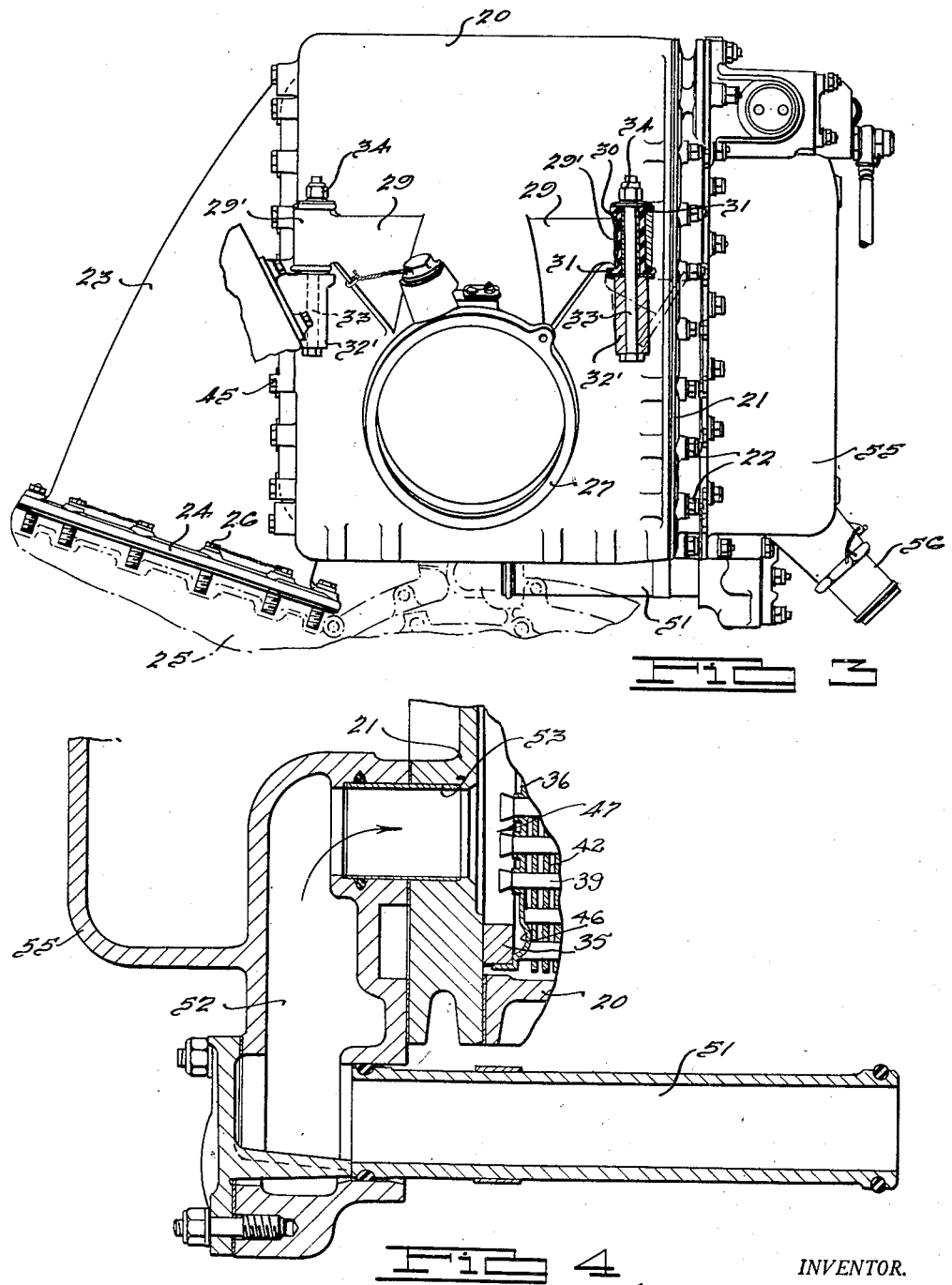

Oct. 12, 1948.  J. G. VINCENT  2,451,132
INTERNAL-COMBUSTION ENGINE
Filed Oct. 22, 1943  4 Sheets-Sheet 3
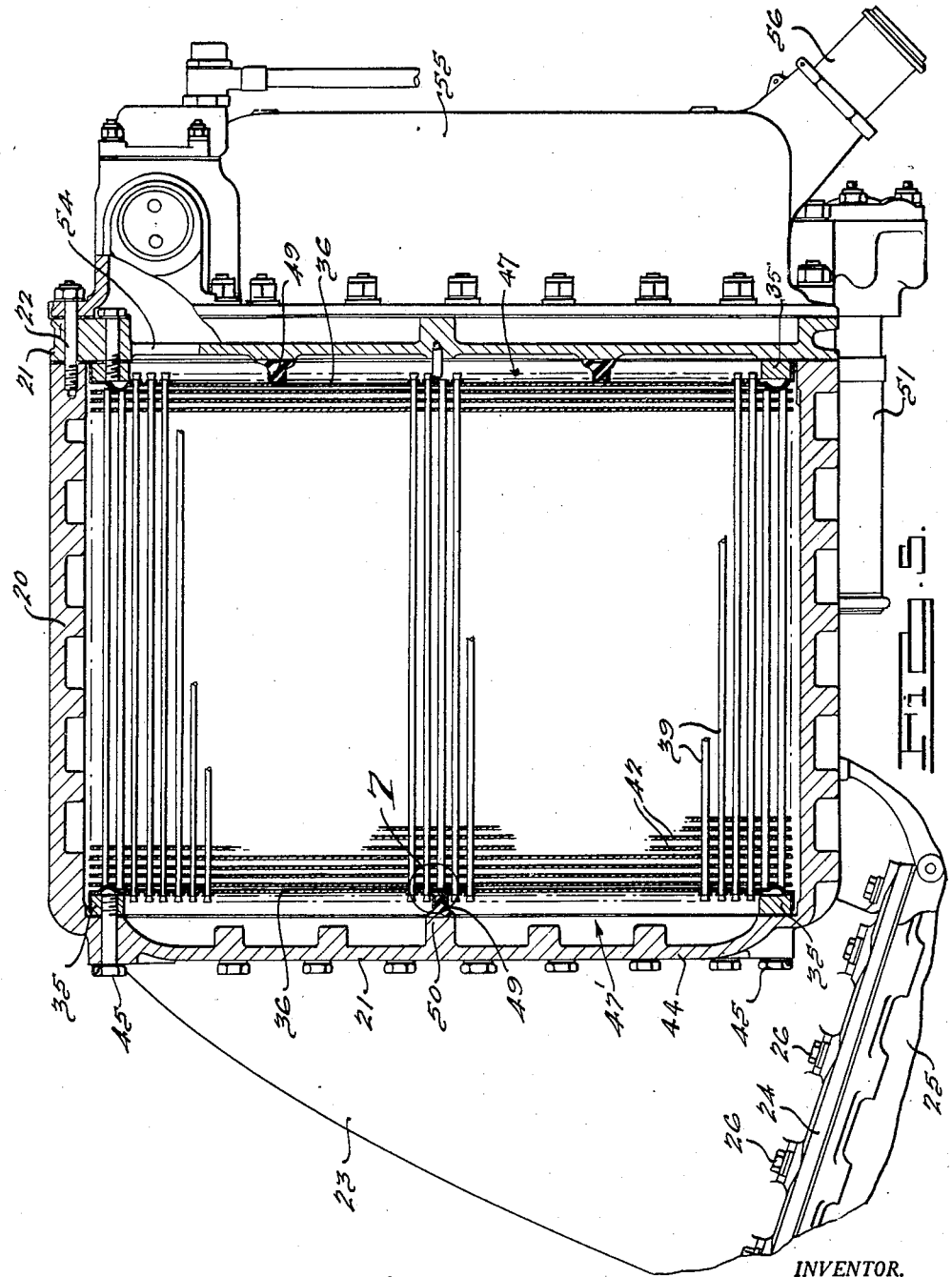
INVENTOR.
Jesse G. Vincent.
BY
Sibletts & Hart
ATTORNEYS.

Oct. 12, 1948.  J. G. VINCENT  2,451,132
INTERNAL-COMBUSTION ENGINE
Filed Oct. 22, 1943  4 Sheets-Sheet 4
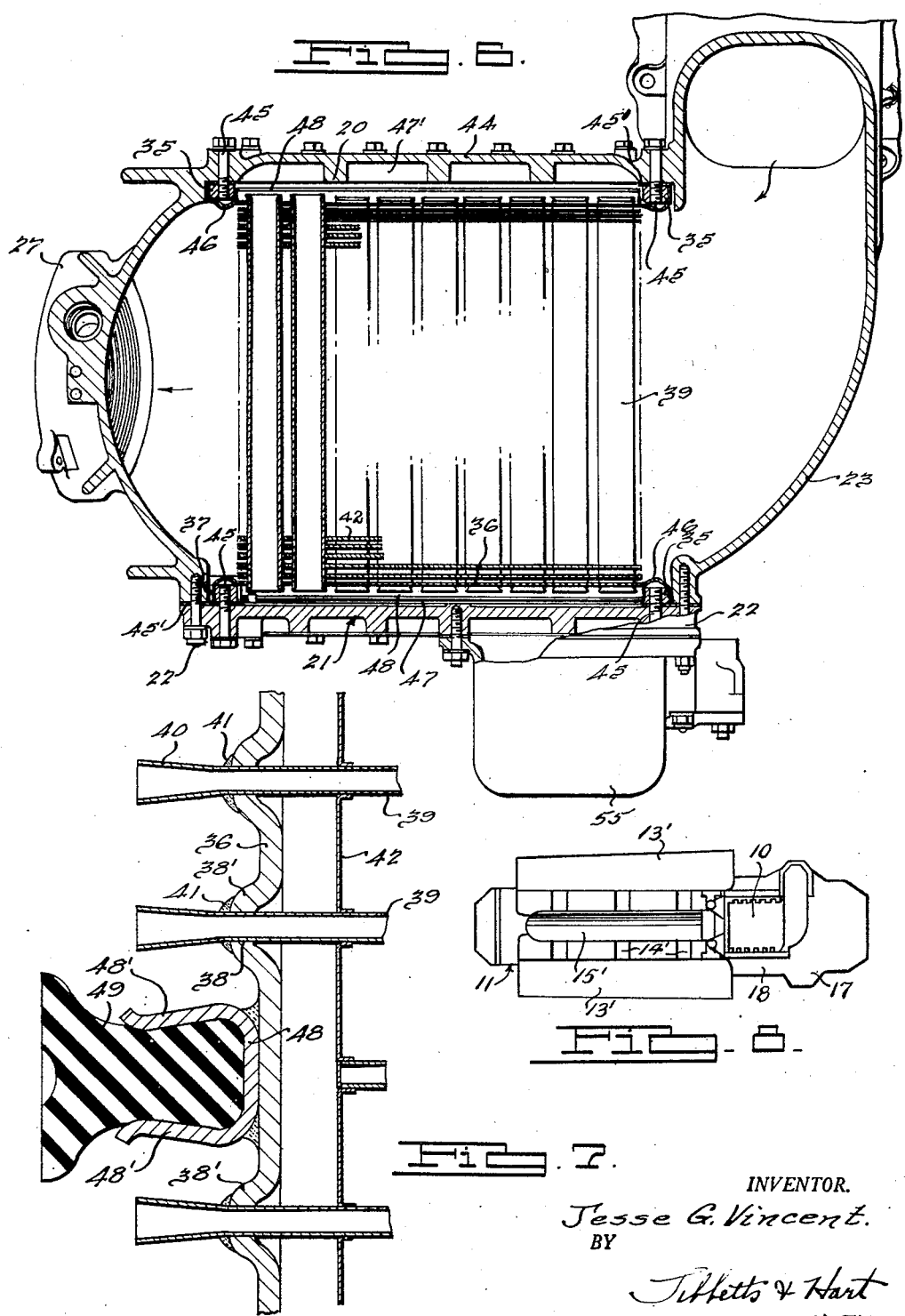
INVENTOR.
Jesse G. Vincent.
BY
Tibbetts & Hart
ATTORNEYS.

Patented Oct. 12, 1948

2,451,132

UNITED STATES PATENT OFFICE 2,451,132

INTERNAL-COMBUSTION ENGINE

Jesse G. Vincent, Grosse Pointe Park, Mich., assignor to Packard Motor Car Company, Detroit, Mich., a corporation of Michigan Application October 22, 1943, Serial No. 507,279

8 Claims. (Cl. 123—119)

1

This invention relates to internal combustion engines and more particularly to an engine heat exchange device for cooling fuel while flowing from a supercharger to the intake manifold.

One of the objects of the invention is to provide a heat exchange device or aftercooler for cooling engine fuel that will be efficient and sturdy.

Another object of the invention is to mount a fuel aftercooler on two spaced parts of an engine structure so that relative movement of the supporting engine parts will not react on the aftercooler.

Another object of the invention is to provide a core supporting structure in a heat exchange device that will compensate for tolerances in the core receiving casing beyond allowable limits without fracturing sealed connections.

Still another object of the invention is to improve the efficiency of a heat transfer device by the relation and arrangement of partition means designed to cause sinuous flow of the coolant in the heat transfer chamber.

Other objects of the invention will appear from the following description taken in connection with the drawings, which form a part of this specification, and in which:

Fig. 1 is a fragmentary side elevational view of an engine having the invention incorporated therewith, partly broken away to show the forward mounting for the heat exchange unit;

Fig. 2 is an enlarged detailed view of a portion of Fig. 1 showing the heat exchange unit and a portion of the engine on which it is mounted;

Fig. 3 is a front elevational view of the heat exchange unit;

Fig. 4 is a sectional view of the heat exchange unit taken on line 4—4 of Fig. 2, showing the coolant inlet;

Fig. 5 is a sectional view of the heat exchange unit taken on line 5—5 of Fig. 2;

Fig. 6 is another sectional view of the heat exchange unit taken on line 6—6 of Fig. 2;

Fig. 7 is an enlarged sectional view of a fragment of the heat exchange unit indicated within the circle 7 on Fig. 5.

Fig. 8 is a diagrammatic plan view of the power unit.

The power unit is shown composed of internal combustion engine 11, gear casing 18 and a supercharger device 17 arranged in the order named and bolted together. The engine comprises upper crankcase 12 on which cylinder banks 13 are mounted in V relation, lower crankcase 14 and cylinder head blocks 15 containing fuel inlet

2 manifolding connected by arms $14^1$ with a manifold $15^1$ located between the cylinder blocks. The arms are fixed rigidly with the cylinder head blocks and with the manifold $15^1$. Covers $13^1$ extend over the cylinder head blocks. Carburetor 16 is attached to the supercharger device. The spaced relation of the supercharger device and the engine will allow limited relative movement of such parts when the engine is operating.

The heat exchange device or aftercooler 10 is located between the supercharger device and the cylinder head and manifold portion of the engine power unit. As these parts of the power unit are spaced apart and have limited relative movement when the engine is operating, it is proposed to fix the aftercooler on one of the power unit parts and to provide a supporting connection between an engine part and the aftercooler allowing relative movement thereof.

The aftercooler casing is composed of casing 20 having an open side closed by wall 21 secured by bolts 22. A fuel inlet leg or support 23 extends from the rear end of the casing and terminates at its lower end below the casing and in an offset relation thereto. There is a flange 24 around the lower end of the leg mounted on the upper flanged outlet end 25 of the supercharger structure and bolts 26 secure such flanges rigidly together. Leg 23 opens into the rear end of the chamber formed within casing 20, 21 and a neck 27 extends from the forward end of the casing and is connected with the fuel intake manifold $15^1$ leading to the cylinder head portions 15 by a suitable flexible conduit means 28.

The rear portion of the heat exchange device or aftercooler is rigidly supported on the supercharger device by the offset inlet leg. The forward mounting means is made at two points and preferably is such that engine vibration is not communicated to the heat exchange device. Projecting from the forward end of casing 20 is a pair of spaced brackets or arms 29, see Figs. 1 and 3, terminating in cylindrical portions 29' in which is arranged rubber sleeve bushings 30. The end portions of such bushings are formed with flanges 31 extending beyond the upper and lower cylindrical portions of the brackets. A pair of brackets or arms 32 extend one from each of the rear portions of the V cylinder head block structures 15 and have cylindrical terminal portions 32' registering with the cylindrical portions 29' of brackets 29. Bolts 33 extend through the bushings 30 and through bracket portions 32'. The lower flanges of the bushings 30 lie between the bracket portions 29' and 32' and the upper flanges of the bushings 30 lie between the top of bracket portions 29' and bolt securing nuts 34. It will be seen that the brackets or arms on the engine head blocks and the heat exchange device can move relatively a limited amount and that bushings 30 will damp vibrations that would otherwise flow through the forward mounting means.

A heat exchange core structure is mounted within the chamber formed by casing 20, 21. The core structure comprises two spaced rectangular frames 35, plate members 36 having their edge portions bent over and fixed to the frames, tubes 39 and fins 42. The edge portions 37 of the plate members bent over the frames are secured by welding and these members serve as carriers or supports for the tubes. Plate members 36 overlie adjacent ends of the frames and are formed of sheet metal having a bead 46 rolled around the edge portions adjacent the frames so that the frames can be distorted a limited extent without flexing or distorting the area of the members bounded by the bead. The area of the plate members within the bead is formed with dimples 38' having openings 38 therein through which the end portions of the tubes 39 project. After the tubes are projected through the plate members, with such members a desired distance apart, the ends 40 of the tubes are flared by expansion thereby preventing outward displacement of the members. The tubes and the plate members are further secured together by the application of solder 41 which also provides a sealing means between the tubes and the openings in the dimples of the plate members. The plate member openings are similarly arranged so that the tubes will be parallel. Fins 42 are applied to the tubes between the plate members to assist in the transfer of heat from the fuel mixture and these fins are in the form of spaced metal plates having openings through which the tubes project.

The core structure is assembled as a unit prior to insertion into the chamber in casing 20 and is attached to the cover 21. The core structure supporting means comprising the frames and plate members 36 covering adjacent sides of the frames are utilized as partitions in the casing to provide a pair of isolated coolant chambers 47, 47'. The side walls of the casing, which are the cover 21 and the opposite casing wall 44, are dished away from the core and the inner face of the surrounding shoulders 44' are finished to receive gaskets 45' against which the frames of the core structure fit. Bolts 45 secure the frames to the side walls of casing. It will be noted that tolerances must be carefully observed in fabricating the unitary core structure and in finishing the faces of the shoulders in the casing engaged by the core structure to seal the coolant chambers 47, 47' from the casing chamber through which the fuel flows. Due to the nature of the device, these tolerances are hard to maintain and even when close limits are observed they add up to provide a condition whereby the core structure cannot be located to seal the coolant chambers without distortion of the plate members. Such distortion would normally fracture the seals around the tubes so that coolant would leak into the fuel chamber. By providing the beads 46 in the plate members, the frames can be distorted a limited extent when fixing the core in the casing without distorting the tube carrying area of the plate members. Thus tolerances beyond the normal allowable limits can be compensated for, thereby speeding up manufacture of the casing and core parts and reducing scrap.

Fuel from the supercharger device flows upwardly through the supercharger connection 25 and into the inlet leg 23 of the heat exchange casing. This leg is open to the rear end of casing 20 and the fuel passes through the chamber within the casing where it thermally contacts heat transfer tubes 39 and fins 42. After passing through the heat transfer portion of the core, the fuel travels on to the manifold of the engine through the neck 27 and the flexible connection 28.

Chambers 47 and 47' at the sides of the casing are open to the ends of the heat transfer tubes and chamber 47 is connected with a coolant circulating system. Provision is made to cause the coolant to travel back and forth several times through the core structure in flowing from the inlet end to the outlet end of coolant chamber 47. This sinuous flow of the coolant through the core structure is accomplished by horizontally extending partition means in chambers 47 and 47' dividing them into several sections. These partition means comprise wall members 49 preferably formed of rubber strips. These partition walls are seated in carrier members 48 fixed to the core structure. The carrier members can be formed of resilient sheet metal and their base portions can be welded or soldered to the outer faces of the plate members 36. These carrier members extend horizontally and substantially the full length of the plate members between the ends of the frames and their inwardly bowed arms 48' are sufficiently resilient to allow the rubber strips to be inserted and retained therebetween. The rubber strips contact the inner face of walls 21 and 44, and such walls are preferably formed with ribs 50 for engagement by the strips. The partition means in the two coolant chambers in the casing are staggered relatively, chamber 47 being divided into three sections by an upper and lower partition means and chamber 47' being divided into two sections by a partition means located between the partition means in chamber 47.

A fitting 51, see Figs. 4 and 5, is suitably connected with the pressure portion of a coolant system and is carried by a manifold casing 55 secured to cover 21. Passage 52 in the casing 55 communicates with opening 53 in the bottom portion of the cover so that coolant will flow into the lower section of chamber 47. The casing cover 21 has an opening 54 through the upper portion thereof establishing communication between the upper section of chamber 47 and manifold casing 55. This manifold casing has an outlet fitting 56 suitably connected with the pressure portion of the coolant system and communicates with opening 54. Coolant will flow from the lower section of chamber 47 through the tubes 39 open thereto to the lower section of chamber 47', and then back to the intermediate section of chamber 47 through the tubes open to establish such communication. Coolant flows from the middle section of chamber 47 to the upper section of chamber 47' and back to the upper section of chamber 47. Thus the coolant flows back and forth twice across the heat exchange chamber in passing through the core structure.

The partition means and the carrier members form a part of the unitary core structure. The core structure is assembled and then secured to the removable casing cover 21 and is inserted and removed from the casing with the cover. To secure the core structure to seal off chambers 47 and 47', the frames must be pulled against the casing by the securing bolts and the beading 45 will allow considerable distortion of the frames for this purpose without stressing the tube carrying portion of the carrier plates. The front mounting for the heat exchange casing allows some movement of the supporting structure relative thereto and such mounting will absorb vibration between the casing and the supporting structure.

It will be understood that various forms of the invention other than that described above may be used without departing from the spirit or scope of the invention.

What is claimed is:

1. In a V type engine, a fuel supercharger fixed rigidly to the engine, spaced cylinder head blocks, an aftercooler fixed rigidly at one end to the supercharger and in open communication therewith, means through which fuel flows from the aftercooler to the cylinder head blocks, and means flexibly suspending the top portion of the aftercooler on the cylinder head blocks.

2. In a V type engine, a fuel superchanger fixed rigidly on the engine, spaced cylinder head blocks, an aftercooler fixed rigidly at one end to the supercharger and in open communication therewith, manifold means having a flexible portion connecting the interior of the aftercooler with the cylinder head blocks, a pair of spaced brackets on the cylinder head blocks, a pair of brackets on the aftercooler adapted to overlie the cylinder structure brackets, rubber means between the two pairs of brackets, and means securing the aligned brackets together in a relation permitting limited relative movement thereof.

3. In a power unit, an engine encircling two banks of angularly disposed cylinders and head blocks having a fuel inlet manifold fixed thereto, a supercharger fixed rigid with the engine beyond one end of the banks of cylinders, an aftercooler having an offset hollow fuel inlet leg resting on and fixed rigidly to the supercharger, said leg extending from the portion of the aftercooler remote from the cylinders and communicating with the interior of the supercharger, resilient connections between the ends of the cylinder head blocks and adjacent upper portions of the aftercooler, and flexible fuel conduit means connecting the aftercooler with the inlet manifolds.

4. In a power unit, an engine having two spaced cylinder head blocks, a supercharger fixed rigidly with one end of the engine, an aftercooler fixed on and in communication with the supercharger, resilient means connecting the head blocks with adjacent portions of the aftercooler, and fuel inlet manifold means connecting the aftercooler with the head blocks.

5. In a power unit, an engine having two spaced cylinder head blocks, a supercharger fixed rigidly to an end of the engine, an aftercooler fixed rigidly on and in communication with the supercharger, support arms on the aftercooler, support arms on the head blocks mating with the aftercooler arms, resilient means between the mating arms, means securing the mating arms together, and fuel inlet manifold means connecting the aftercooler with the head blocks.

6. In a power unit, an engine having angularly disposed cylinder banks, head blocks on the banks and fuel manifolding leading to the head blocks; a supercharger fixed rigidly to the engine beyond one end of the banks of the cylinders; an aftercooler fixed rigidly on the supercharger; mounting connections between the end portions of the cylinder head blocks and adjacent portions of the aftercooler arranged to permit relative movement thereof; and a flexible fuel conduit means connecting the aftercooler with the manifolding.

7. In a power unit, an engine having spaced cylinder head blocks, a manifold between and fixed rigidly to the head blocks, a supercharger fixed to one end of the engine beyond the head blocks, an aftercooler having a depending inlet leg communicating with and fixed on the supercharger, a pair of yielding vibration damping support means on the head blocks on which the aftercooler is mounted, and a flexible fuel conduit means connecting the aftercooler with the manifold.

8. In a power unit, an engine having spaced cylinder head blocks, a manifold mounted between and rigidly supported by said head blocks, a supercharger fixedly supported upon the engine, a mixture cooling device having means communicating with the supercharger, said means forming a fixed support for the cooling device on the supercharger, yielding vibration damping support means for the cooling device on the head blocks, and flexible mixture conduit means connecting the cooling device with the manifold.

JESSE G. VINCENT.

REFERENCES CITED

The following references are of record in the file of this patent:

UNITED STATES PATENTS

| Number | Name | Date |
|---|---|---|
| 1,369,558 | Sherbondy | Feb. 22, 1921 |
| 1,597,720 | Carrier | Aug. 31, 1926 |
| 1,597,733 | Soule | Aug. 31, 1926 |
| 1,604,197 | Rushmore | Oct. 26, 1926 |
| 1,605,126 | Maynard | Nov. 2, 1926 |
| 1,780,294 | Davis, Jr. | Nov. 4, 1930 |
| 1,813,754 | Metzgar | July 7, 1931 |
| 2,034,235 | Holmes | Mar. 17, 1936 |
| 2,132,450 | Wolf | Oct. 11, 1938 |
| 2,191,179 | O'Donnell | Feb. 20, 1940 |
| 2,366,365 | Sorensen | Jan. 2, 1945 |

FOREIGN PATENTS

| Number | Country | Date |
|---|---|---|
| 464,348 | England | Apr. 16, 1937 |
| 377,036 | Italy | Dec. 5, 1939 |
| 542,592 | England | Jan. 19, 1942 |

Certificate of Correction

Patent No. 2,451,132.   October 12, 1948.

JESSE G. VINCENT

It is hereby certified that errors appear in the printed specification of the above numbered patent requiring correction as follows:

Column 2, line 32, for "151 leading" read *15' leading*; column 5, line 37, claim 3, for the word "encircling" read *including*;
and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*